United States Patent
Cha et al.

(10) Patent No.: US 9,896,371 B2
(45) Date of Patent: Feb. 20, 2018

(54) TEMPERED GLASS CUTTING METHOD AND CUTTING APPARATUS

(71) Applicant: CORNING PRECISION MATERIALS CO., LTD., Asan-si, Chungcheongnam-do (KR)

(72) Inventors: Jaemin Cha, Asan-si (KR); Kiyeon Lee, Asan-si (KR); Youngseok Lee, Asan-si (KR); Ji Hoon Rhee, Asan-si (KR); Jaeho Lee, Asan-si (KR)

(73) Assignee: Corning Precision Materials Co., Ltd., Asan-si, Chungcheongnam-do (KR)

(*) Notice: Subject to any disclaimer, the term of this patent is extended or adjusted under 35 U.S.C. 154(b) by 0 days.

(21) Appl. No.: 14/407,921

(22) PCT Filed: Jun. 12, 2013

(86) PCT No.: PCT/KR2013/005159
§ 371 (c)(1),
(2) Date: Dec. 12, 2014

(87) PCT Pub. No.: WO2013/187683
PCT Pub. Date: Dec. 19, 2013

(65) Prior Publication Data
US 2015/0166390 A1    Jun. 18, 2015

(30) Foreign Application Priority Data

Jun. 12, 2012   (KR) .................. 10-2012-0062779

(51) Int. Cl.
*C03C 21/00*    (2006.01)
*C03B 27/012*   (2006.01)
(Continued)

(52) U.S. Cl.
CPC .............. *C03B 33/02* (2013.01); *B28D 1/221* (2013.01); *C03B 25/025* (2013.01);
(Continued)

(58) Field of Classification Search
CPC ....... C03C 21/00–21/008; C03C 25/00–25/12; C03C 27/00–27/067;
(Continued)

(56) References Cited

U.S. PATENT DOCUMENTS 3,921,873 A * 11/1975 Dahlberg ................ C03B 33/09
                                                            225/2
9,169,154 B2 * 10/2015 Lee ........................ C03C 21/008
(Continued)

FOREIGN PATENT DOCUMENTS

JP     2001-261354 A     9/2001
JP     2002-289899 A    10/2002
(Continued)

OTHER PUBLICATIONS

Gotou (JP 2002-289899 A) dated Oct. 4, 2002 (English language machine translation of document cited on IDS dated Dec. 12, 2014). [online] [retrieved Jan. 7, 2016]. Retrieved from: Espacenet.*
(Continued)

*Primary Examiner* — Erin Snelting
(74) *Attorney, Agent, or Firm* — McDermott Will & Emery LLP

(57) ABSTRACT

The present invention is devised to solve the problems of the above-described conventional technologies. The purpose of the present invention is to provide a tempered glass cutting method and cutting apparatus which can prevent the defects of the tempered glass breaking when same is cut and improve the reliability of the product. To this end, provided is a tempered glass cutting method which comprises: a tempering step of generating compressive stress on a glass
(Continued)

sheet to temper the glass sheet; a compressive stress relaxation step of applying heat to the cut portion of the tempered glass sheet to relax the compressive stress; and a cutting step of cutting the cut portion.

8 Claims, 2 Drawing Sheets

(51) Int. Cl.
*C03B 33/02* (2006.01)
*C03B 33/09* (2006.01)
*C03B 33/023* (2006.01)
*B28D 1/22* (2006.01)
*C03B 25/02* (2006.01)

(52) U.S. Cl.
CPC .......... *C03B 27/012* (2013.01); *C03B 33/023* (2013.01); *C03B 33/09* (2013.01); *C03B 33/091* (2013.01); *C03B 33/093* (2013.01); *C03C 21/002* (2013.01); *C03C 21/008* (2013.01); *Y02P 40/57* (2015.11)

(58) Field of Classification Search
CPC ....... C03C 33/02–33/04; C03C 33/09–33/093; C03C 37/012
See application file for complete search history.

(56) References Cited

U.S. PATENT DOCUMENTS

| | | | | |
|---|---|---|---|---|
| 9,328,011 | B2* | 5/2016 | Washko, Jr. | ........... C03B 33/091 |
| 2005/0250639 | A1* | 11/2005 | Siebers | ................... C03C 3/083 501/68 |
| 2006/0075783 | A1 | 4/2006 | Kim et al. | |
| 2010/0206008 | A1 | 8/2010 | Harvey et al. | |
| 2011/0183116 | A1* | 7/2011 | Hung | ...................... B24B 7/241 428/156 |
| 2013/0192305 | A1* | 8/2013 | Black | .................. C03B 33/0222 65/30.14 |
| 2013/0295333 | A1* | 11/2013 | Kim | ........................ G06F 3/041 428/157 |
| 2014/0165652 | A1* | 6/2014 | Saito | ...................... C03B 33/04 65/28 |

FOREIGN PATENT DOCUMENTS

| | | | |
|---|---|---|---|
| JP | 2005-112683 A | 4/2005 | |
| JP | 2005-320234 A | 11/2005 | |
| JP | 2006-096658 A | 4/2006 | |
| JP | 2011-251879 A | 12/2011 | |
| KR | 10-0259382 B1 | 6/2000 | |
| WO | WO 2012070819 A2 * | 5/2012 | ............. G06F 3/041 |

OTHER PUBLICATIONS

Shelby, James E. Introduction to Glass Science and Technology. Cambridge, UK, The Royal Society of Chemistry, 1997. p. 108-109.*
International Search Report issued in International Application No. PCT/KR2013/005159 dated Aug. 14, 2013, with English translation.
Korean Office Action issued in Application No. 10-2012-0062779 dated Mar. 22, 2016.
Japanese Office Action issued in Application No. 2015-517183 dated Mar. 15, 2016.

* cited by examiner

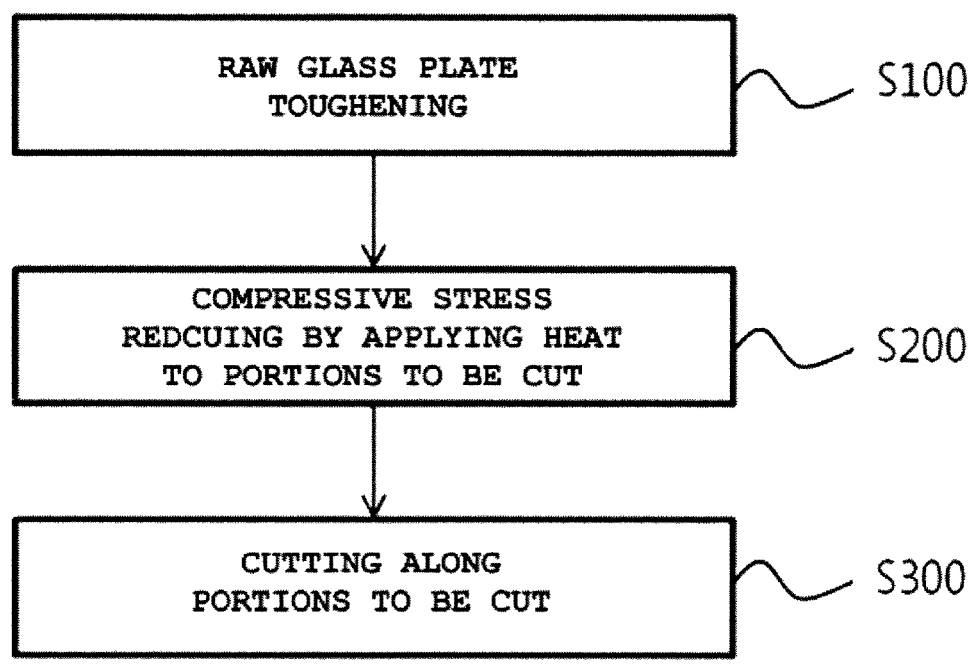
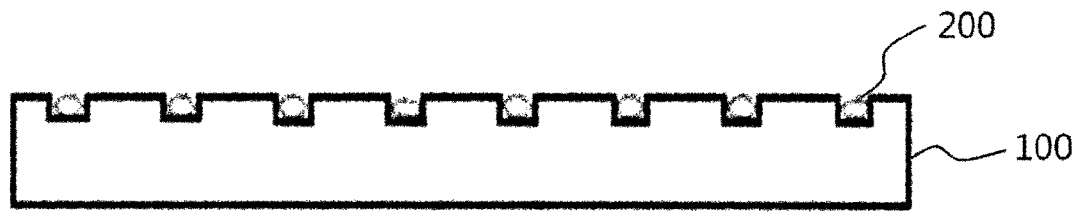

TEMPERED GLASS CUTTING METHOD AND CUTTING APPARATUS

RELATED APPLICATIONS

This application is the U.S. National Phase under 35 U.S.C. § 371 of International Application No. PCT/KR2013/005159, filed on Jun. 12, 2013, which in turn claims the benefit of Korean Application No. 10-2012-0062779, filed on Jun. 12, 2012, the disclosures of which are incorporated by reference herein.

TECHNICAL FIELD

The present invention relates to a method and apparatus for cutting toughened glass, and more particularly, to a method and apparatus for cutting toughened glass able to divide a toughened glass plate into unit pieces of glass.

BACKGROUND ART

Glass is treated as an indispensable component in a variety of technological and industrial fields including imaging and optical devices such as monitors, cameras, video tape recorders (VTRs) and mobile phones, transportation equipment such as vehicles, a variety of dishes, and construction facilities. Accordingly, glass products having a variety of properties that meet the requirements of respective industrial fields are manufactured and used.

In particular, currently, chemically toughened thin glass is used for a cover glass or a display glass in display devices, such as organic light-emitting diode (OLED) displays, liquid crystal displays (LCDs), plasma display panels (PDPs) and field emission displays (FEDs).

Glass toughening methods generally include a physical toughening method and a chemical toughening method. The physical toughening method, also referred to as air-cooled toughening, is mainly applied to safety glasses for vehicles. The chemical toughening method can be applied to a thin glass sheet having a complicated shape or a thickness of about 2 mm or less. The chemical toughening method improves the strength and hardness of a glass by substituting alkali ions having a smaller ion radius (generally Na ions) with alkali ions having a larger ion radius (generally K ions) in certain conditions. The ion exchange generates large compressive stress on the glass surface, thereby increasing the strength and hardness of the glass.

A brief description will be given below of a method of manufacturing chemically toughened glass.

First, a raw glass plate is subjected to flattening, and subsequently is cut according to an intended shape and size using a cutting machine. However, this cutting process may cause deformation or stress to the glass through mechanical processing, thereby having an adverse effect on the reliability of products. In addition, errors in the cutting process may cause some portions of the raw glass plate to be discarded, thereby lowering the yield.

First cleaning is carried out to remove glass powder or impurities from unit pieces of glass that are formed through the cutting of the raw glass plate. Top and bottom edges of the unit pieces of glass are chamfered using a grinder. Second cleaning is carried out to remove glass powder or abrasive powder from ground products. The cleaned unit pieces of glass are dried. The surfaces of the unit pieces of glass are chemically toughened by a chemically toughening process as follows.

A unit piece of glass is immersed into a bath in which a potassium nitrate ($KNO_3$) solution heated to a temperature ranging from 450 to 500° C. is contained. The unit piece of glass is maintained in this state for 3 hours or longer, such that toughening occurs through ion exchange. The unit piece of glass taken out of the bath is subsequently subjected to cleaning and drying.

However, this method of manufacturing chemically-toughened unit pieces of glass has the drawback of low productivity in the manufacture of the chemically-toughened glass since a raw glass plate is cut into a predetermined size before being chemically-toughened.

Accordingly, after the chemical toughening, the raw glass plate is cut into unit pieces of glass using a water jet, a subscriber device, a laser, or the like. However, according to this method, deformation or stress may occur in the glass due to the mechanical processing, thereby causing an adverse effect on the reliability of products. In addition, some portions of the glass are discarded due to errors in the cutting process, thereby lowering the productivity of the toughened glass, which is problematic.

In order to overcome this problem, Korean Patent Application Publication No. 10-2011-0086475 disclosed a method of cutting a toughened raw glass plate. This method includes forming a photoresist pattern on the toughened raw glass plate except for portions along which the toughened raw glass plate is to be cut, cutting the toughened raw glass plate along the portions to be cut by wet etching, and removing the photoresist. However, since this method includes additional processes for cutting the raw glass plate, such as the photoresist processing and the etching, the manufacturing cost of the toughened glass is increased. In addition, the use of hydrofluoric acid (HF), sulfuric acid ($H_2SO_4$), or the like causes environmental contamination, which is problematic.

In addition, Korean Patent No. 10-1022591 disclosed a method of cutting a raw glass plate. According to this method, both surfaces of the raw glass plate are patterned into a chemically-toughened area and a non-chemically-toughened area, followed by ion exchange. Afterwards, the raw glass plate is cut along some portions thereof in which the ion exchange has not been carried out. However, micromachining is difficult according to this method. That is, it is difficult to precisely form the pattern with a width less than 1 mm. In addition, the problem of the matching of the patterns on the both surfaces may occur. During the ion exchange, an ion exchange solution may flow over the patterns, thereby causing defects during the cutting. Furthermore, when this method is applied to a large glass plate, stress generated by the localized ion exchange may cause a problem, such as warping, in the glass plate.

The information disclosed in the Background of the Invention section is provided only for better understanding of the background of the invention and should not be taken as an acknowledgment or any form of suggestion that this information forms a prior art that would already be known to a person skilled in the art.

RELATED ART DOCUMENT

Patent Document 1: Korean Patent Application Publication No. 10-2011-0086475
Patent Document 2: Korean Patent No. 10-1022591

Technical Problem

Various aspects of the present invention provide a method and apparatus for cutting toughened glass able to prevent defects, such as breakage, in toughened glass while the toughened glass is being cut and to improve the reliability of products.

Technical Solution

In an aspect of the present invention, provided is a method of cutting toughened glass including: toughening a raw glass plate by generating compressive stress thereon; reducing the compressive stress by applying heat to portions of the toughened raw glass plate to be cut; and cutting the toughened raw glass plate along the portions to be cut.

The process of reducing the compressive stress may reduce the compressive stress by applying the heat to the portions to be cut with hot wires.

The temperature of the heat applied to the portions to be cut at the process of reducing the compressive stress may be equal to or higher than a transition point and is lower than a melting point of the raw glass plate.

A compressive stress of the portions to be cut reduced by the step of reducing the compressive stress may be 100 MPa or less.

The width of each of the portions to be cut may be 5 mm or less.

The toughening process may toughen the raw glass plate by chemical toughening or thermal toughening.

The chemical toughening may include coating a surface of the raw glass plate with an ion exchange solution in which a potassium nitrate solution and zinc oxide powder are mixed, followed by drying and subsequently heating a resultant structure.

The toughened raw glass plate may be cut along the portions to be cut using a laser or a scribing device.

In another aspect of the present invention, provided is an apparatus for cutting a raw glass plate that is toughened by compressive stress generated thereon. The apparatus includes: a substrate having grooves on one surface thereof on which the raw glass plate is to be seated; and hot wires disposed in the grooves.

The grooves may be a plurality of grooves.

The substrate may be a heat-resistant glass substrate.

Advantageous Effects

According to the present invention as set forth above, it is possible to cut a raw glass plate by removing compressive stress from only portions to be cut after toughening the raw glass plate, thereby preventing the glass from being broken due to deformation or stress in the glass during the cutting of the glass.

In addition, it is possible to obtain the reliability of cut pieces of glass and improve the yield of the unit pieces of glass by preventing cutting defects.

Furthermore, it is possible to improve the efficiency and productivity of the cutting by simply and efficiently reducing compressive stress in a raw glass plate.

The methods and apparatuses of the present invention have other features and advantages that will be apparent from or are set forth in greater detail in the accompanying drawings which are incorporated herein, and in the following Detailed Description of the Invention, which together serve to explain certain principles of the present invention.

DESCRIPTION OF DRAWINGS

FIG. 1 is a schematic flowchart illustrating an exemplary embodiment of a method of cutting toughened glass according to the present invention;

FIG. 2 is a schematic flowchart illustrating an exemplary embodiment of an apparatus for cutting toughened glass according to the present invention;

MODE FOR INVENTION

Figure 3:
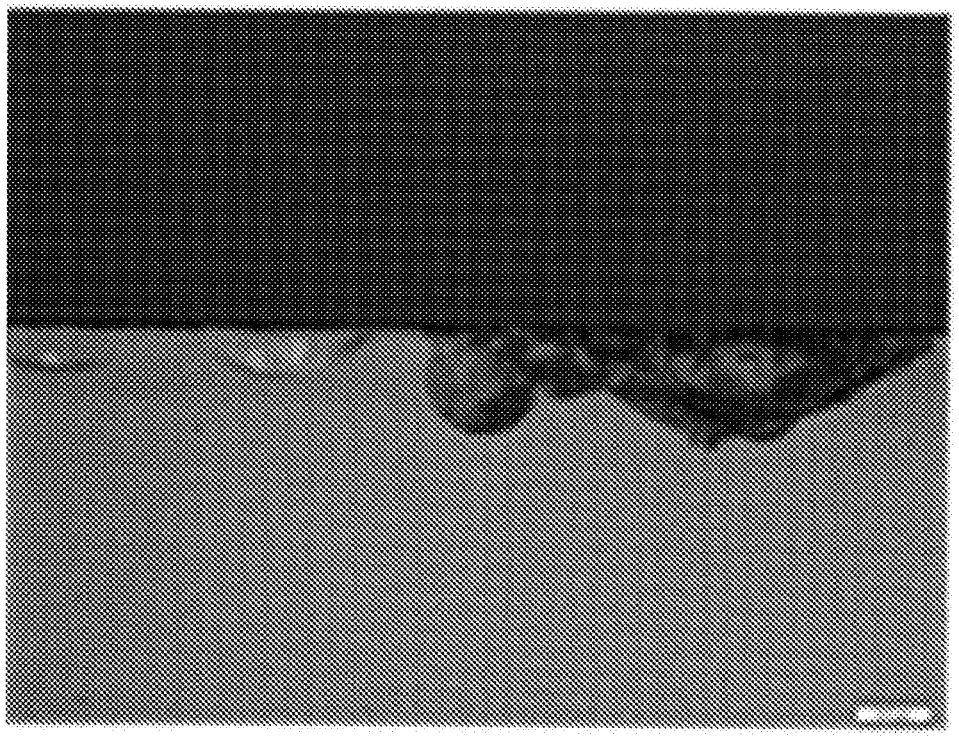
FIG. 3 is a transmission microscopy picture of a portion cut from a raw glass plate without being heat-treated with hot wires.

Reference will now be made in detail to exemplary embodiments of a method and apparatus for cutting toughened glass according to the present invention in conjunction with the accompanying drawings, so that a person skilled in the art to which the present invention relates could easily put the present invention into practice.

Throughout this document, reference should be made to the drawings, in which the same reference numerals and symbols are used throughout the different drawings to designate the same or similar components. In the following description of the present invention, detailed descriptions of known functions and components incorporated herein will be omitted in the case that the subject matter of the present invention is rendered unclear.

FIG. 1 is a schematic flowchart illustrating an exemplary embodiment of a method of cutting toughened glass according to the present invention.

Referring to FIG. 1, the method of cutting toughened glass according to an exemplary embodiment of the present invention includes a toughening step S100, a compressive stress-reducing step S200 and a cutting step S300.

At S100, a raw glass plate is toughened by generating compressive stress on the raw glass plate in order to facilitate dividing the toughened raw glass plate into unit pieces of glass having a predetermined size.

The method of toughening the raw glass plate by generating compressive stress on the raw glass plate includes chemical toughening and thermal toughening. However, the method of toughening glass by generating compressive stress on the glass is applicable without being restrictive.

More particularly, the toughening step according to this embodiment may be implemented as dry chemical toughening that toughens a raw glass plate by coating the surface of the raw glass plate with the slurry of an ion exchange solution in which a potassium nitrate solution and zinc oxide powder are mixed, followed by drying and subsequently heating the resultant structure.

The zinc oxide powder forms a uniform film on the glass surface and is easily attached to the glass surface due to its superior spreadability. The zinc oxide powder also serves to remove impurities from potassium nitrate salt (nitric acid potassium salt). After the ion exchange, the zinc oxide powder may be easily cleaned with water.

In this manner, the raw glass plate is toughened using a common firing furnace without the use of an ion exchange furnace. Accordingly, it is possible to improve the productivity of the toughened glass and prevent the characteristics of ion exchange from being dampened by impurities within the potassium nitrate solution.

It is preferable that the density of the potassium nitrate solution ranges from 10 g per 100 ml water to solubility. If the density of the potassium nitrate solution is less than 10 g per 100 ml water, the density of potassium required for ion exchange becomes insufficient. Consequently, the ion exchange slows down, and a sufficient degree of compressive stress is not formed on the glass surface, such that the strength is not increased to a significant level. In contrast, if the density of the potassium nitrate solution is greater than the solubility, potassium nitrate is not sufficiently dissolved, causing localized ion exchange on the glass surface. Consequently, uniform compressive stress is not formed on the glass surface. When potassium nitrate is dissolved into water, it is preferable that the dissolving temperature is maintained at room temperature or 90° C.

In addition, it is preferable that the average particle size of the zinc oxide powder is 1 μm or less in order to make ion exchange uniform and improve the fluidity of a mixture solution.

Furthermore, it is preferable that the amount of the zinc oxide powder mixed to 100 ml of the potassium nitrate solution ranges from 15 to 50 g. If the amount of the zinc oxide powder is less than 15 g for the 100 ml potassium nitrate solution, it is impossible to form a significant degree of compressive stress on the glass surface. In contrast, if the amount of the zinc oxide powder is greater than 50 g, the viscosity of the solution is significant. It is difficult to make the mixture solution uniform, and the glass surface is coated with an excessive amount of the slurry from the ion exchange solution.

Afterwards, at S200, the compressive stress is reduced by heating portions of the toughened raw glass plate to be cut.

Here, the temperature of the heat applied to the portions to be cut is equal to or higher than the transition point and is lower than the melting point of the toughened raw glass plate. It is preferable that the portions to be cut are heated to a temperature ranging from 300 to 400° C.

It is preferable that the heat is applied for a short time period of 10 seconds or less.

When the glass toughened with the compressive stress is heated to a temperature that is equal to or higher than the transition point and is lower than the melting point thereof in this manner, the compressive stress within the glass is reduced, thereby reducing the strength and hardness of the glass.

It is preferable that the compressive strength of the portions to be cut reduced at the compressive stress-reducing step S200 is 100 MPa or less.

The width of the portion to be cut is 5 mm or less, more preferably, 2 mm or less. The narrower the width of the portions to be cut is, the greater the yield of unit pieces of glass produced by the cutting is.

The compressive stress-reducing step may be realized by applying heat to the portions to be cut with hot wires. Due to the application of heat with the hot wires, the width of the portions to be cut may become very small, thereby improving the yield of the unit pieces of glass.

The above-described compressive stress-reducing step may be realized by an apparatus for cutting toughened glass, as illustrated in FIG. 2.

Referring to FIG. 2, the apparatus for cutting toughened glass according to an exemplary embodiment of the present invention includes a substrate 100 having grooves on one surface thereof on which a toughened raw glass plate to be cut is to be seated and wires 200 disposed in the grooves.

With this configuration, it is possible to simply and efficiently reduce the compressive strength of the toughened raw glass plate by seating the toughened raw glass plate on the substrate 100 on which the hot wires 200 are disposed.

The grooves may be a plurality of grooves, and the hot wires 200 may be a plurality of hot wires disposed in the plurality of grooves.

In this manner, it is possible to concurrently reduce the compressive stress on a plurality of portions of the toughened raw glass plate to be cut using the plurality of hot wires 200 disposed in the plurality of grooves, thereby improving productivity.

The substrate 100 may be formed of heat-resistant glass since it must withstand heat from the hot wires 200.

Finally, at S300, the toughened glass plate is cut along the portions to be cut, the compressive strength of which is reduced, whereby the toughened glass plate is divided into a plurality of unit pieces of glass.

Although the process of cutting the portions to be cut may be carried out using a laser or a scribing device, this is not intended to be limiting. The cutting process may be carried out by a variety of other methods using, for example, a water jet.

In this manner, the toughened raw glass plate is divided into unit pieces of glass by reducing compressive stress on the portions of the raw glass plate to be cut by applying heat to the portions to be cut and subsequently cutting the raw glass plate along the portions to be cut. Accordingly, it is possible to prevent defects with which the raw glass plate or the unit pieces of glass may deformed or broken due to stress caused by mechanical processing during the process of cutting the raw glass plate into the unit pieces of glass.

Figure 4:
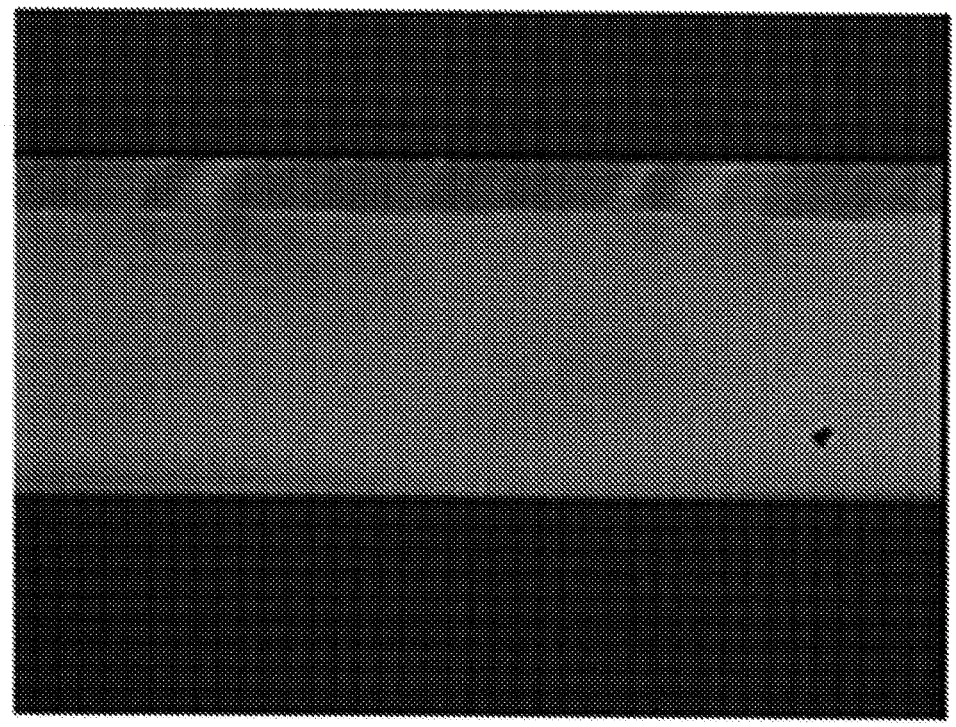
FIG. 4 is a transmission microscopy picture of a portion cut from a raw glass plate after being heat-treated with hot wires.

FIG. 3 is a transmission microscopy picture of a portion cut from a raw glass plate without being heat-treated with a hot wire, and FIG. 4 is a transmission microscopy picture of a portion cut from a raw glass plate after being heat-treated with a hot wire.

As illustrated in FIG. 3, the portion cut from the toughened raw glass plate without being heat-treated with the hot wire has a defect, such as breakage. In contrast, as illustrated in FIG. 4, according to an exemplary embodiment of the present invention, the portion cut from the toughened raw glass plate after being heat-treated with the hot wire is smooth and does not have a defect, such as breakage.

The foregoing descriptions of the specific exemplary embodiments of the present invention have been presented with respect to the drawings. They are not intended to be exhaustive or to limit the present invention to the precise forms disclosed, and obviously many modifications and variations are possible for a person skilled in the art in light of the above teachings.

It is intended therefore that the scope of the present invention not be limited to the foregoing embodiments, but be defined by the Claims appended hereto and their equivalents.

What is claimed is:

1. A method of cutting toughened glass comprising:
   toughening a raw glass plate by generating compressive stress in a surface layer of the raw glass plate;
   reducing the compressive stress in the surface layer at portions of the toughened raw glass plate to be cut by applying heat to the surface layer at the portions to be cut; and
   cutting the toughened raw glass plate along the portions to be cut while applying heat to the surface layer at the portions to be cut so that the compressive stress in the surface layer at the portions to be cut remains reduced.

2. The method according to claim 1, wherein the compressive stress in the surface layer at the portions to be cut is reduced by applying the heat to the surface layer at the portions to be cut with hot wires.

3. The method according to claim 1, wherein the compressive stress in the surface layer at the portions to be cut is reduced to 100 MPa or less by the step of reducing the compressive stress.

4. The method according to claim 1, wherein a width of each of the portions to be cut is 5 mm or less.

5. The method according to claim 1, wherein the raw glass plate is toughened by chemical toughening or thermal toughening.

6. The method according to claim 5, wherein the chemical toughening comprises coating a surface of the raw glass plate with an ion exchange solution in which a potassium nitrate solution and zinc oxide powder are mixed, followed by drying and subsequently heating a resultant structure.

7. The method according to claim 1, wherein the toughened raw glass plate is cut along the portions to be cut using a laser or a scribing device.

8. The method according to claim 1, wherein a temperature of the heat applied to the surface layer at the portions to be cut at the step of reducing the compressive stress is equal to or higher than a transition point and is lower than a melting point of the raw glass plate.

\* \* \* \* \*